Figure 1:
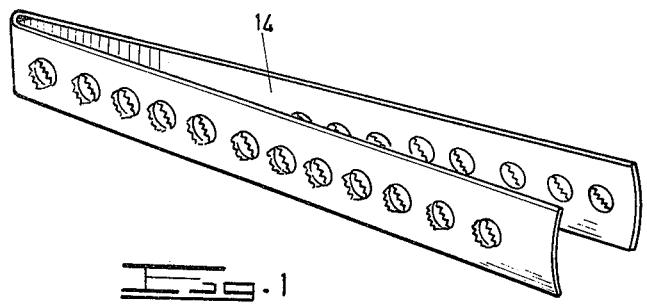

United States Patent [19]
Schoeman

[11] 3,927,467
[45] Dec. 23, 1975

[54] LOCATING AND SECURING OF WOOD JOINTS

[76] Inventor: Musgrave Schoeman, P.O. Westville, Natal, South Africa

[22] Filed: July 16, 1974

[21] Appl. No.: 489,793

[52] U.S. Cl.................................. 29/526; 403/292
[51] Int. Cl.[2] ........................................ F16B 13/06
[58] Field of Search ........... 403/292, 297, 298, 265, 403/260, 267, 251; 85/83, 84, 85, 11, 23; 52/753 E, 753 B; 144/309 M; 29/522, 526

[56] References Cited
UNITED STATES PATENTS

| 917,907 | 4/1909 | Taylor | 85/85 |
|---|---|---|---|
| 931,869 | 8/1909 | Heinz | 85/23 UX |
| 942,693 | 12/1909 | Wintermute | 85/83 X |
| 961,992 | 6/1910 | Underwood | 403/267 |
| 1,548,456 | 8/1925 | Goodman | 85/23 |
| 1,559,619 | 11/1925 | Karitzky | 85/85 |
| 2,404,928 | 7/1946 | Schutten | 85/83 |

FOREIGN PATENTS OR APPLICATIONS

| 20,498 | 6/1930 | Australia | 403/251 |
|---|---|---|---|

*Primary Examiner*—Andrew V. Kundrat
*Attorney, Agent, or Firm*—Ladas, Parry Von Gehr, Goldsmith & Deschamps

[57] ABSTRACT

A method of joining pieces of wood or the like includes the steps of forming registering holes in the pieces, locating therein a strip of material provided with formations along its length to grip the wood or the like, the strip extending through both holes, and then inserting a dowel into the two holes. The strip is preferably bent back on itself into a V.

2 Claims, 2 Drawing Figures

U.S. Patent  Dec. 23, 1975  3,927,467

LOCATING AND SECURING OF WOOD JOINTS

This invention relates to the joining of wood or similar materials and in particular to the joining of pieces of particle board, such as the type referred to as "chip board." However, the invention also finds use in the joining of plywood and many other materials.

It is an object of the invention to provide a method of and means for aligning and joining two pieces and also to secure them rigidly together. The pieces may be joined at right angles or any other angle and the necessity for clamping pressure can be eliminated.

A method of joining pieces of wood or the like according to the invention includes the steps of forming registering holes in the pieces, locating therein a strip of material extending through both holes and then inserting a dowel into the two holes.

In a preferred form of the invention the strip of material is provided with formations to grip the wood or other material. Such formations may be formed by pressing out broken dimples in the strip.

The strip may also be formed at almost twice the combined lengths of the holes and may be doubled back on itself in the form of a V. The ends of the V may be bent over for initial location in a hole and also to improve the strength of the joint.

The dowel may have a head, in which case the first hole is countersunk accordingly. The head may be plain cylindrical or it may be domed or otherwise shaped for appearance sake.

The dowel may be coated with a suitable adhesive, either just before location or prior thereto. In the latter case, the adhesive could be activated by dipping in water or applying an appropriate chemical activator. It will be appreciated that the adhesive imparts additional strength to the joint.

The strip is preferably of metal and the dowel of wood, but it will be appreciated that many other materials may be used for the two items.

The top surface of the dowel may be covered with a suitable covering such as wood veneer or the like to match with the surface of the materials to be joined.

Preferably a light gauge metal is used for the strip, its width being less than the diameter of the hole and may also be transversely curved, the radius of curvature being approximately equal to that of the dowel.

The invention makes possible the marketing of kits for making cupboards and other objects of furniture and the like. The pieces are pre-drilled and a supply of strips and dowels provided with instructions of how to erect the object. It will be appreciated that the joint of the invention may be (depending on whether or not an adhesive was used, and of the strength of the adhesive) easily disassembled.

Figure 2:
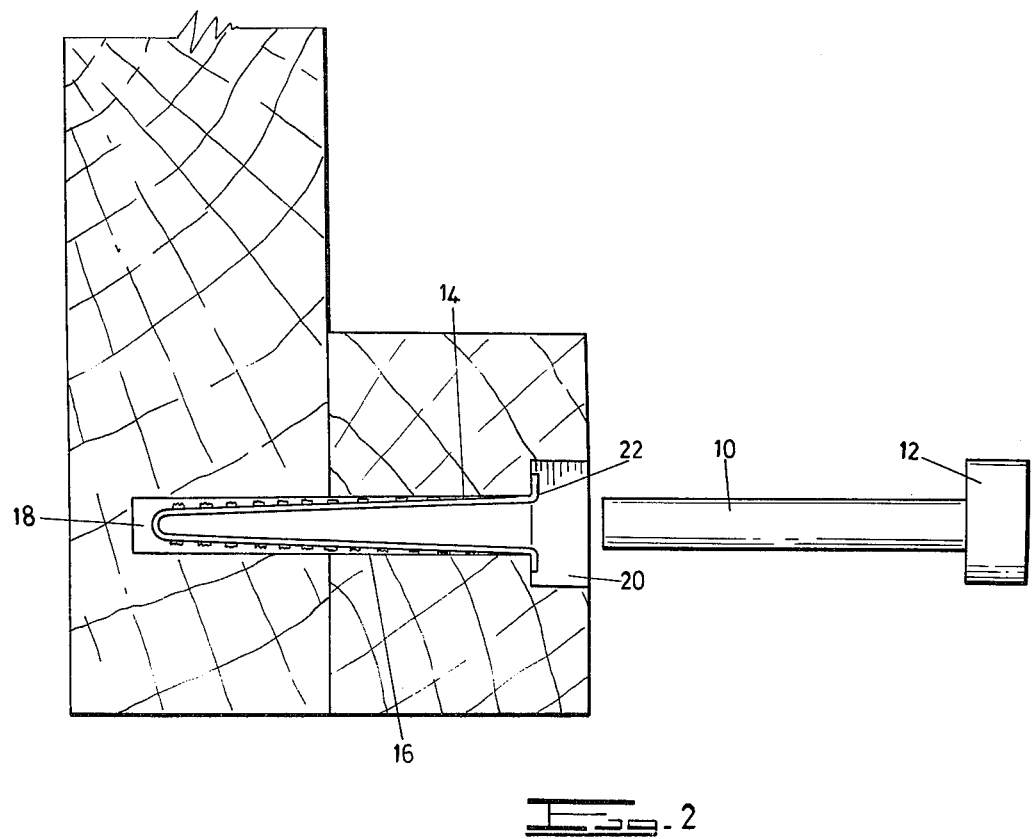

An example of the invention is illustrated in the accompanying drawings, in which FIG. 1 is a perspective view of a strip and FIG. 2 is a sectional side view of an assembly according to the invention.

In the drawings, a dowel 10 is provided which has a head 12 of plain cylindrical shape.

A strip 14 of light gauge metal which is curved transversely and which is in the form of a V, is located in registering holes 16, 18, as shown. The countersink 20 corresponds to the head 12 of the dowel and bent-over portions 22 of the strip rest in the countersink for location purposes. The strip in FIG. 1 is shown without the bent-over portions 22.

The dowel 10 may, as mentioned above, be coated with a suitable adhesive which is activated prior to insertion into the holes.

I claim:

1. A method of joining pieces of wood or the like including the steps of forming registering holes in the pieces, at least one of the holes being countersunk, locating therein a strip of material extending through both holes, the strip having a width less than the diameter of the holes with formations for gripping both pieces of wood and having a turned over locating portion adapted to rest on the bottom of the countersink, and then inserting a headed dowel of substantially the same diameter as the holes, into the two holes, and against the strip, the dowel having a head complementing the countersink and received therein.

2. The method of claim 1 in which the total length of the strip is almost twice the combined depths of the holes and is bent back on itself to form a V.

* * * * *